Figure 1:
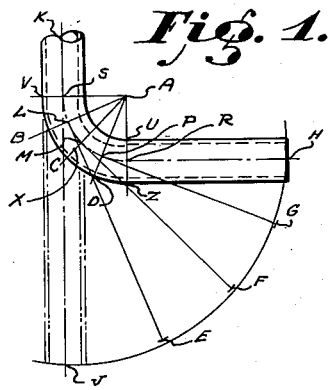

Oct. 16, 1951 R. BROWN 2,571,416
APPARATUS FOR BENDING TUBES
Filed Feb. 20, 1948 7 Sheets-Sheet 1

INVENTOR:
RALPH BROWN;
BY
ATTORNEY.

Oct. 16, 1951   R. BROWN   2,571,416
APPARATUS FOR BENDING TUBES
Filed Feb. 20, 1948   7 Sheets-Sheet 2
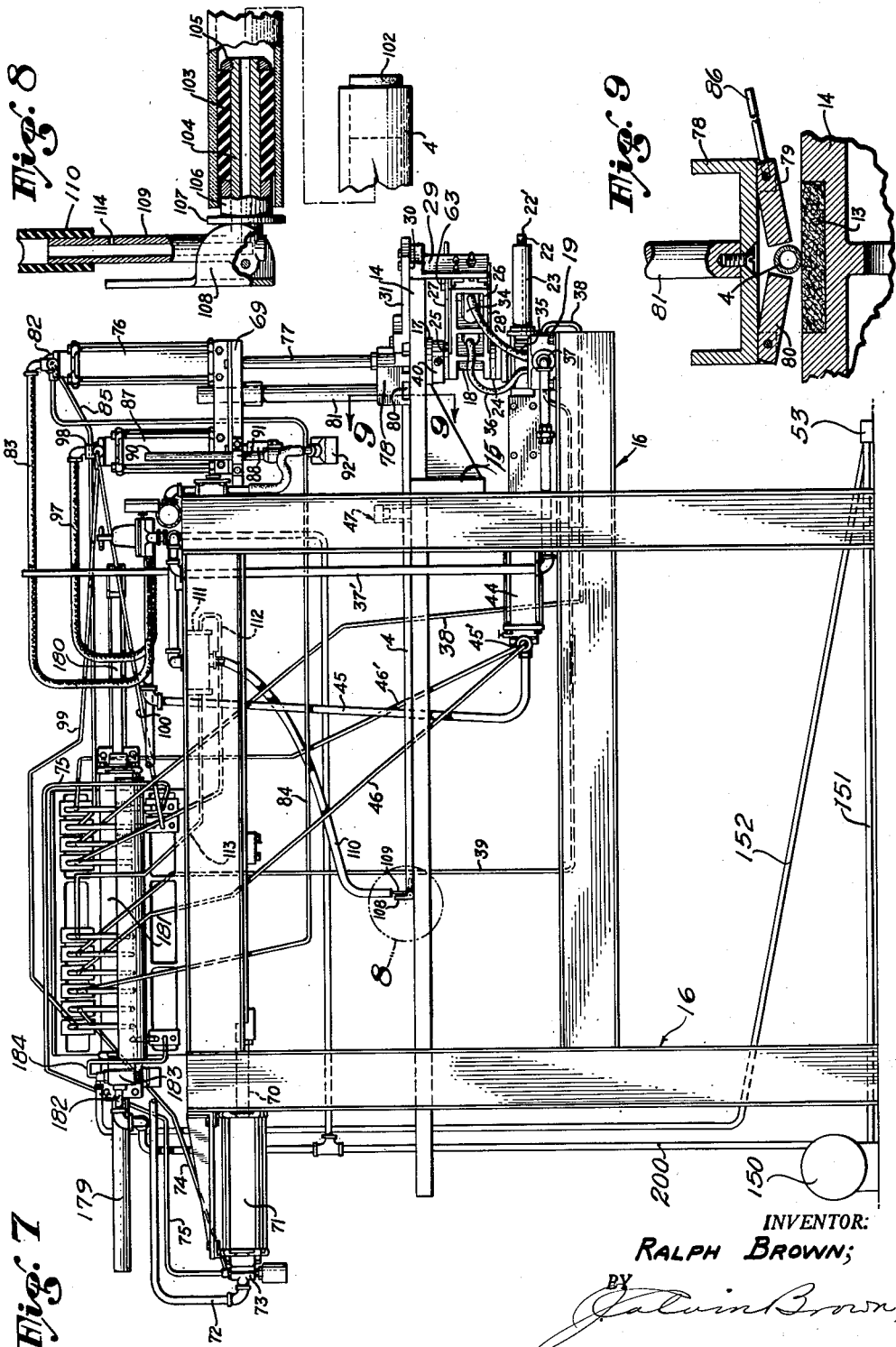
INVENTOR:
RALPH BROWN;
BY
ATTORNEY

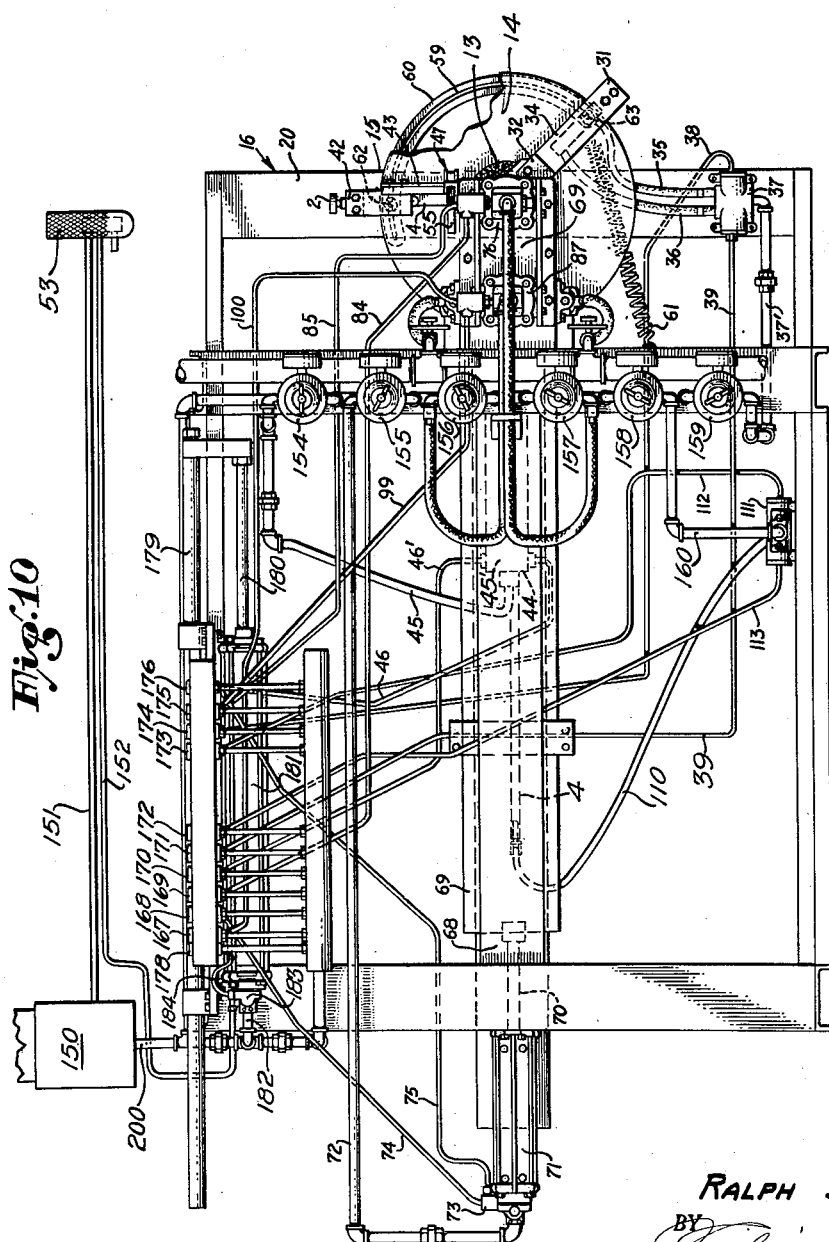

Oct. 16, 1951 R. BROWN 2,571,416
APPARATUS FOR BENDING TUBES
Filed Feb. 20, 1948 7 Sheets-Sheet 4
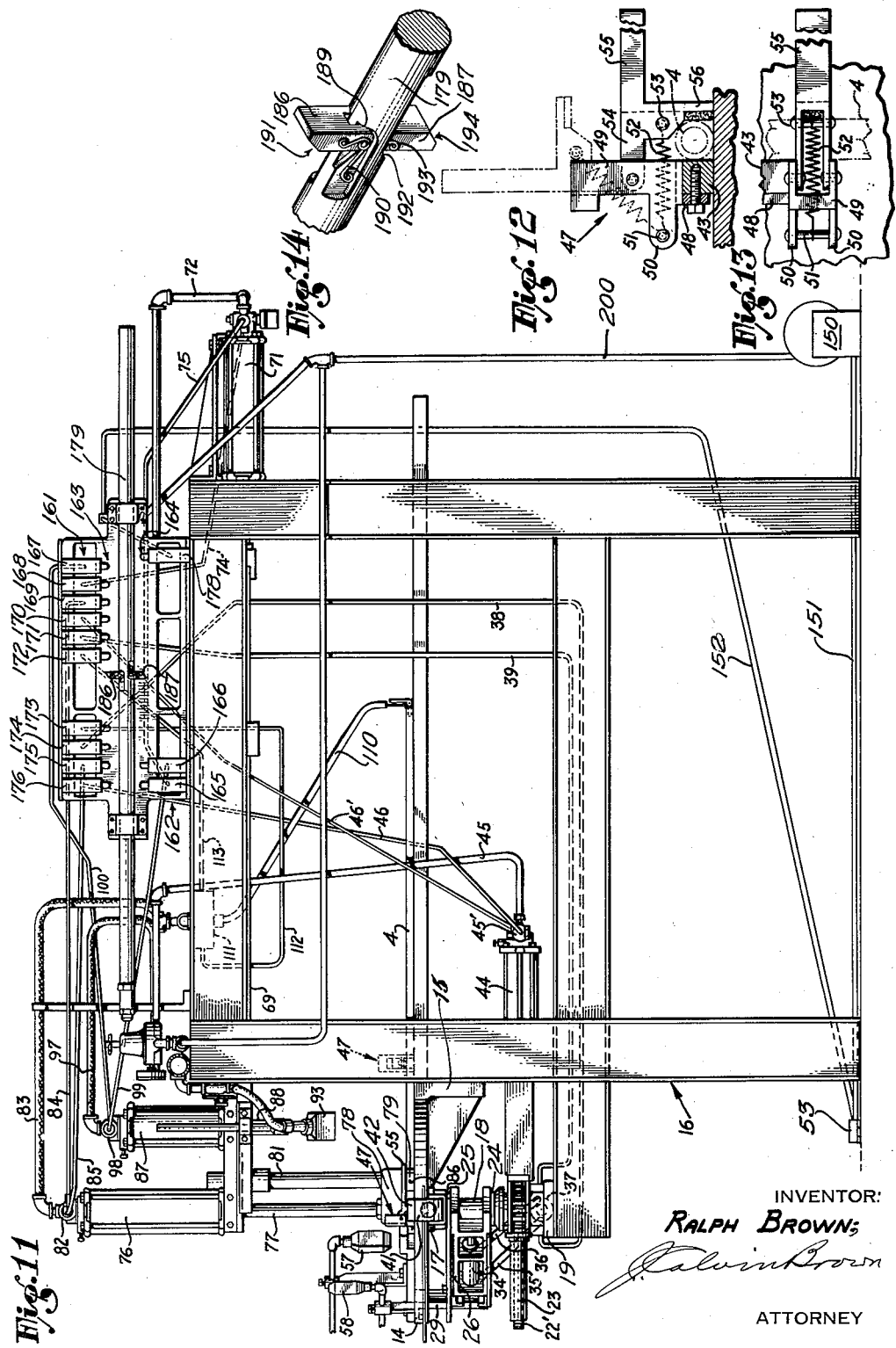
INVENTOR:
RALPH BROWN;
ATTORNEY

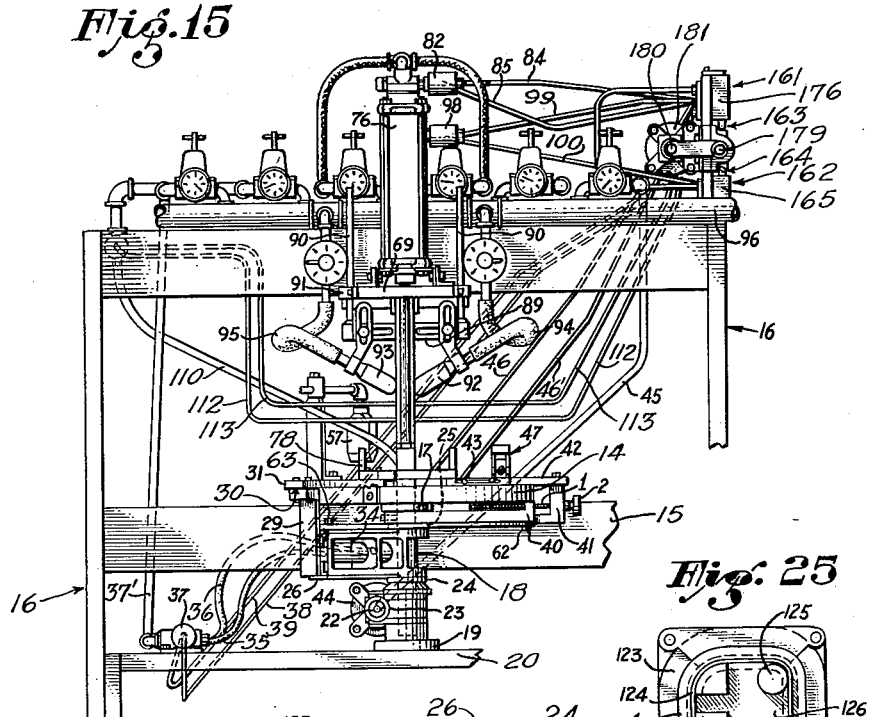

Oct. 16, 1951          R. BROWN          2,571,416

APPARATUS FOR BENDING TUBES

Filed Feb. 20, 1948          7 Sheets-Sheet 6

INVENTOR:
RALPH BROWN;
BY
ATTORNEY.

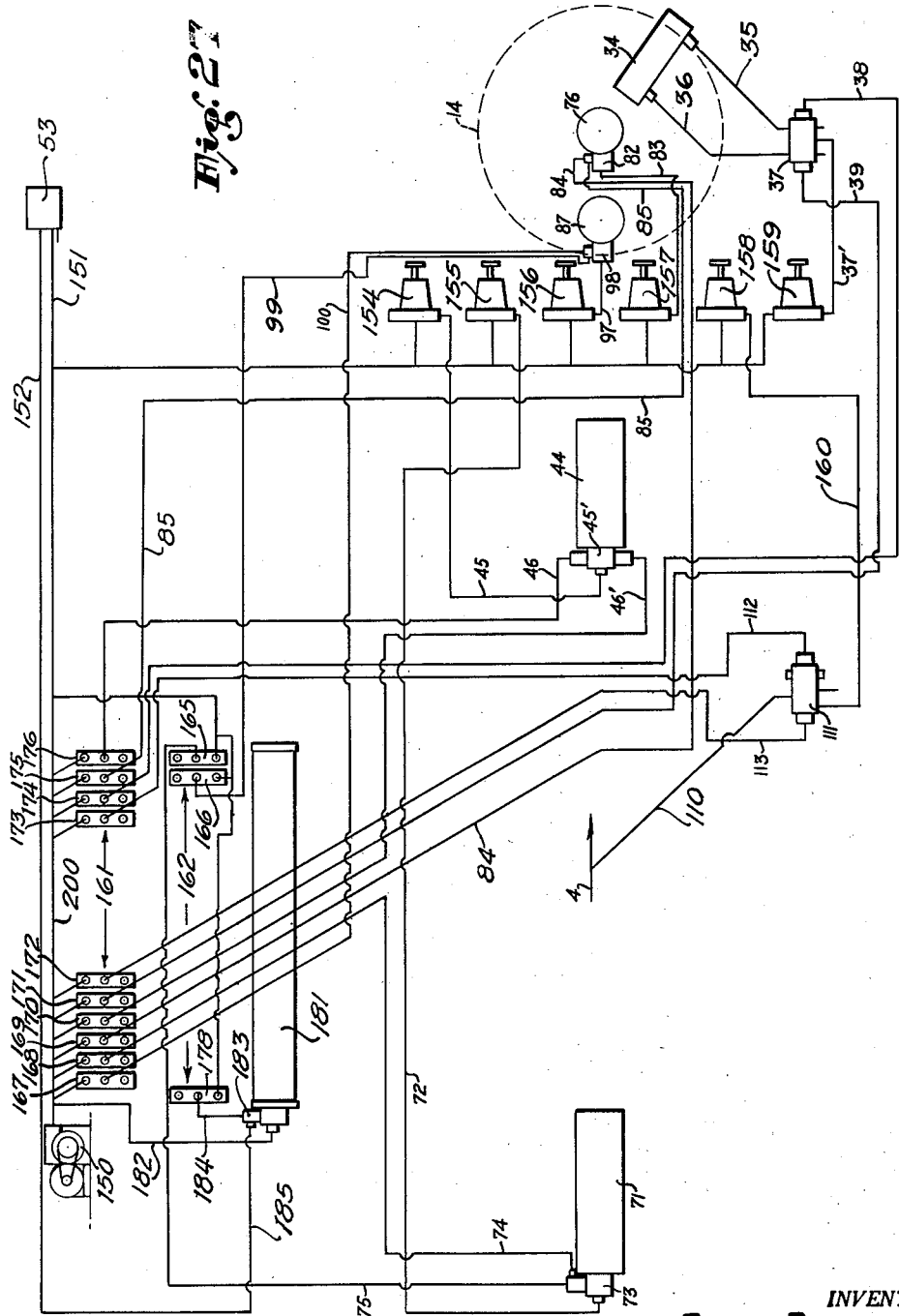

Patented Oct. 16, 1951

2,571,416

UNITED STATES PATENT OFFICE 2,571,416

APPARATUS FOR BENDING TUBES

Ralph Brown, Fallbrook, Calif., assignor to Electrical Products Corporation, Los Angeles, Calif., a corporation of California Application February 20, 1948, Serial No. 9,814

13 Claims. (Cl. 49—7)

This invention relates generally to the art of bending hollow bodies, such as glass, and plastic tubing, and it has especial reference to apparatus for imparting bends to tubular units.

The principal object of the invention is to replace the present methods of manually bending tubes for display and industrial uses, and to provide means in and by which dimensional tubular bodies may be arcuately shaped or formed without variation in the lineal extent thereof, and by which the wall thicknesses of the bodies may be controlled.

So to bend a tube in conformity with the object first related is in the interest of economy and expedition for the essential reason that any elongation representing a diversion from the original involves the necessity for restoration to initial length at the expense of time, labor, and material. It is, therefore, required that the bend length be maintained constant and made to follow any desired lineal path within the tube, and controllably to regulate the application of heat selectively to the outer circumference of the tube in accordance with the arc desired.

To control the thickness of the walls at the bend in the tube, in answer to the second objective enumerated above, is essential to insure strength, obtain uniformity in the bent products, give a pleasing appearance to the work; and proof them against easy breakage.

Further objects of the invention, therefore, are to provide a system of heating the tubes in which the heat may be varyingly applied to the tube circumference in the area where the bend is to be made, then bending the tube in an arcuate path around a point of generation that is movable, to maintain the tube at the same length after the bend is made as it was before when measured on a lineal section of the tube, and to proportion the rate of stretch or elongation of the tube on the outside to the rate of compression on the inside of the bend substantially to equalize the thicknesses of the opposing walls.

It has been found in practice that there is a definite relationship between the pivotal center of the bending medium and the position of the bending forms and that the establishment and maintenance of this relationship is controllable to impart to tubing a true arc shape and, at the same time, to maintain substantially equal the wall thickness inside and outside of the arc without affecting or producing any change in the original length of the tubing as measured on a selected lineal section of the tubing; and this latter attribute is highly desirable because thereby the formation of characters may be made from tubing of predetermined lengths. The tube prior to bending is softened to plastic condition by heat and so maintained during the bending process. However, it is imperative for the facile control of the bending that the heat be variably applied to the tube laterally of the center line thereof. By heating the two sides of the tube more intensely than the top and the bottom, the bending of the tube is more satisfactory and produces a substantial equalization between outside elongation and inside contraction.

A still further object of the invention, therefore, is to provide apparatus for bending tubular bodies in which the tube material is heated differentially for effecting the easier and more uniform bending of the tube.

A still further object of the invention is to provide a machine for carrying into effect these objects in which the entire process of heating the tubes, bending them, and releasing them for removal, is automatically controlled.

Other objects will appear from the specification following, in connection with the accompanying drawings, which illustrate a preferred form or embodiment of the invention, but which obviously may be modified in many ways without departing from the spirit of the invention or the scope of the appended claims.

Figure 2:
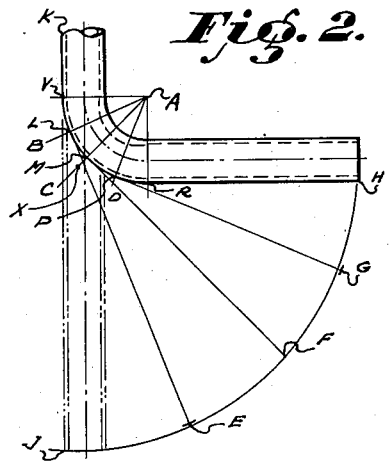
Figure 3:
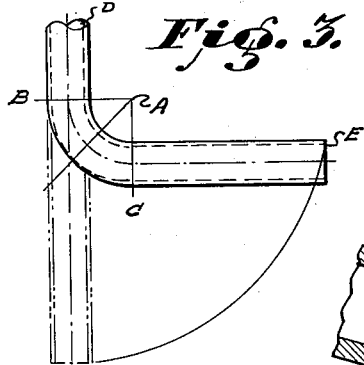
Figure 4:
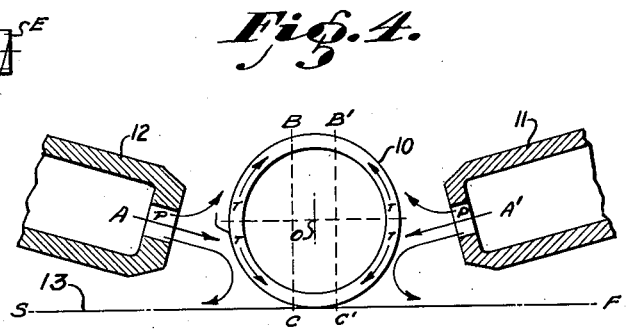
Figure 5:
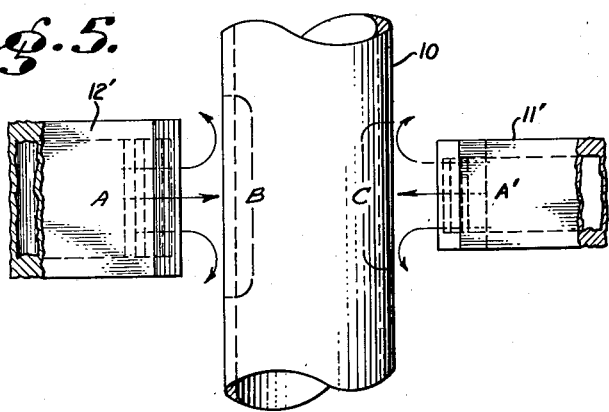
Figure 6:
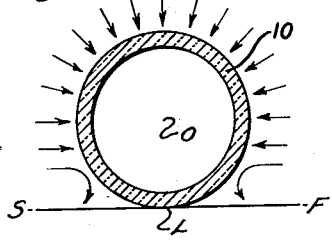
Figure 17:
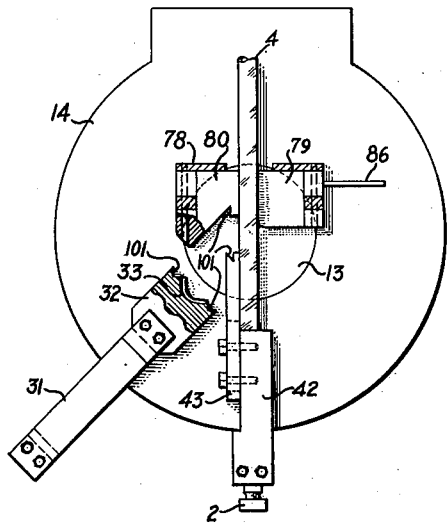
Figure 18:
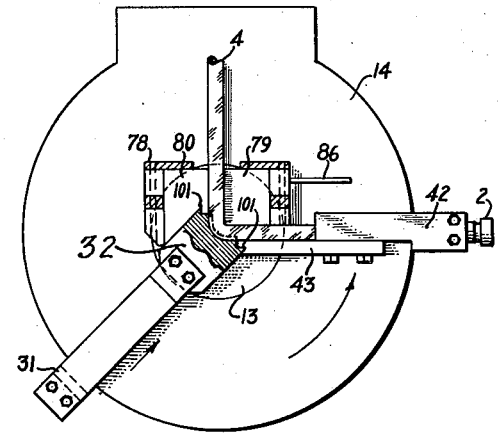
Figure 19:
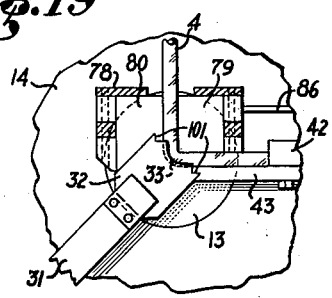
Figure 20:
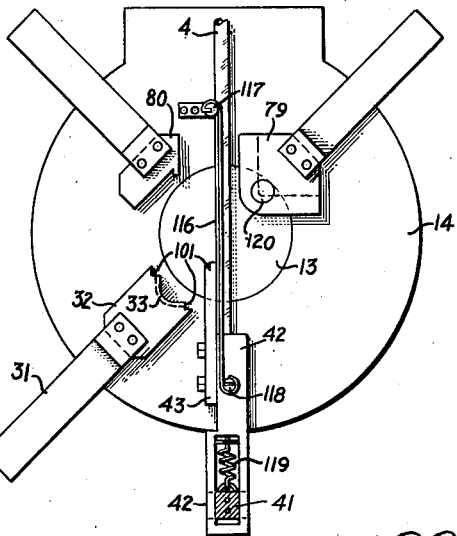
Figure 21:
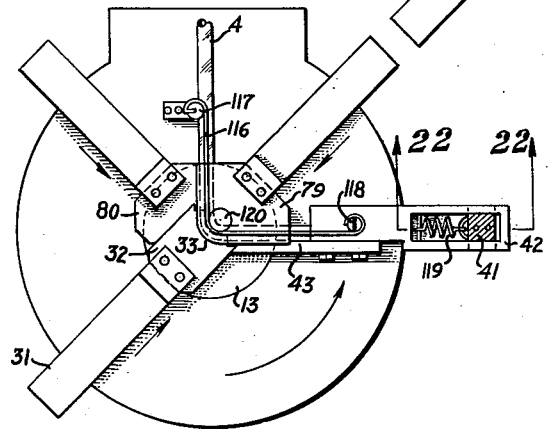
Figure 22:
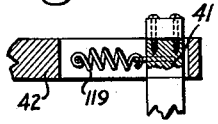

In the drawings:

Figure 1 is a diagrammatic view illustrating generally the principle of making a constant center-line bend, Figure 2 is a diagrammatic view, illustrating generally the principle of making a constant outside line bend, Figure 3 is a diagrammatic illustration of a hand bent tube, Figure 4 is a fragmentary sectional view illustrating instruments and a method of applying heat to a tube, Figure 5 is a plan view of a modification of Figure 4, Figure 6 is a sectional end view of a tube, showing by arrows, one way of heating a tube, as practiced today, Figure 7 is a side view of a machine for carrying my invention into effect, Figure 8 is an enlarged sectional, fragmentary detail illustrating the parts shown within dotted circle on Figure 7, Figure 9 is a fragmentary section on line 9—9 of Figure 7, looking in the direction of the arrows, Figure 10 is a plan view of the machine shown in Figure 7 illustrating the operated position of the bending arm, Figure 11 is a side elevation of the machine shown in Figure 7, but looking from the opposite side thereof, and showing the bending arm in operated position, Figure 12 is an enlarged elevational detail of a locking device for a length of tubing, Figure 13 is a plan view of Figure 12, Figure 14 is an enlarged perspective, fragmentary detail of a form of device for timing the sequential operation of the allied mechanisms, Figure 15 is a front elevation of a tube bending machine showing the bending arm in operated position, Figure 16 is a fragmentary sectional detail of the mechanism for operating the tube bending arm, Figure 17 is a plan view showing the tube support, bending arm, and mold about which the tube is to be bent and the cooperating mold in withdrawn position for restoring the tube to original form after bending, Figure 18 is a similar view showing the tube bent against and about the mold and the tube restoring mold in cooperative position, the latter mold being shown in section, Figure 19 is a similar view showing the mold parts in full line position, Figure 20 is a similar view showing a modification in the application of a metal ribbon to the tube forming parts for controlling the bend line of a tube; the parts are shown in inoperative or normally open position, Figure 21 is a similar view showing the parts in operative or closed position, with the tube bent to the mold forms, Figure 22 is a fragmentary sectional detail on line 22—22 of Figure 21, looking in the direction of the arrows, Figure 23 is a plan view showing the ribbon control as applied to a glass tube hand mold to govern the length of tube and bend section, the mold being shown in open position with a tube length in place, Figure 24 is a front view of the control shown in Figure 23, Figure 25 is a plan view showing the relative parts of Figure 23 in operative position, with a tube bent to multiple angles or in curves, Figure 26 is a front view of the form shown in Figure 25, and Figure 27 is a flow diagram showing the fluid lines for controlling the machine in its operations through its various cycles.

Softening of tubes in given areas of their lineal extents and circumferences is a prerequisite for hot bending of tubular bodies; but for controlling the bending, either with or without mechanical apparatus, it is essential that certain areas of the tube be heated to greater degrees than others. In the present instance, the heating occurs on those areas of the tube which are to become the inside and outside of the bend to be made, and this heating is variable, not only in relation to the top and bottom of the bend area, but also in relation to one side or the other, and hence the heating of the tube on those areas which may become the inside and outside of a desired bent is differentially accomplished, by preference, to facilitate bending without affecting the lineal axial extent of the tube.

By way of illustration, and to initially explain the invention, in part, in Figure 4, the heating of the tube 10 on two sides by burners 11 and 12 is clearly illustrated, the character T denoting the area of heat concentration which occurs through the walls of the tube 10 and is dissipated at points B—B' and C—C' which, therefore, remain cooler than the sides T. There is a heat loss owing to conduction through the bed or support 13, Figures 17 to 20, and for this reason, it is necessary that the disposition of the burners 11 and 12 be such that the heat issuing therefrom be caused to impinge against the sides of the tube 10 below the longitudinal center thereof. The burners 11 and 12, therefore, whether yielding heat of radiation or convection, are angled to the degree shown in Figure 4, and in any event, so that the heat is applied below the center of the tube. It may also be desirable for greater efficiency in expediting the bending of tubular bodies to heat one side of the tubing to a greater degree than the other. In that event, the heating differential is produced by burners 11' and 12', Figure 5, from which it will be seen that the burner 12' is provided with a wider mouth or outlet than the burner 11'. In both instances stated, the heating of the tube is a differential one that is always under the control of the operator and this is highly important in preserving strains and stresses during bending as contrasted to a general heating, illustrated in Figure 6, in which tubular strength is destroyed or considerably impaired.

To specifically explain the invention, I refer to Figure 10, wherein a table 14 is secured to a T-shaped member 15 of a frame, generally indicated at 16. The table 14 is provided centrally thereof with a bed or disc 13, shown in Figures 10, 17–21, preferably of asbestos, which is removable and on which the successive operations of heating and bending are performed. On the under side, this table 14 is provided with a bearing cup 17, Figures 7 and 15, in which is mounted for rotation one end of a vertical column 18, the other end of which is supported in a bearing 19 suitably mounted in a rigid manner upon a cross member 20 of the frame 16. Onto the column 18 is keyed a pinion 21, Figure 16, which, with the rack end 22' of a bar 22, is disposed within a housing 23 on the column 18. Between washer 24 and rim 25 of bearing cup 17, a bracket 26 is carried on and extends at right angles to the column. The upper and lower surfaces of said bracket 26 (see Figure 7), constitutes guideways for upper and lower rails 27 and 28, respectively, to the outer ends of which is secured an upstanding member 29 having a horizontal surface 30 that is flush with the top surface of the table 14. A radially disposed arm 31, Figures 7 and 17 to 21, is bolted to the surface 30 of the member 29 and lies on the table 14 for operation thereover, as presently explained. To the inner end of said arm 31 is fastened a mold or form section 32 having a curvilinear, cross-sectionally semi-circular groove 33, that is adapted to cooperate with a companion section, later referred to, to form a cross-sectionally circular groove for restoring to shape a tube section deformed by heat. Being complementary to the main forming mold, this form section 32 is adjusted to a position enclosing substantially one-half of the tube only after the bend has been made. The reciprocal movement of the arm 31 and its mold section 32 is effected by the piston of a fluid pressure motor 34 housed in said bracket 26, the piston being connected to the upstanding member 29, and the fluid flow to said motor 34 through flexible conduits 35 and 36 being controlled by valve means 37, Figures 7, 10, 15, 27. The control of motive fluid through lines 38 and 39 to the valve means 37 by which the fluid is delivered thereto through a line 37' is through a general control valve system, hereinafter more specifically detailed.

A lever 40, Figure 15, is secured to the column 18 and carries a radially adjustable support 41 upon which is mounted for movement therewith and relatively thereto, an arm 42 that lies flat upon the surface of the table 14 and is provided with a lateral finger 43 that also lies flat upon the surface of the table 14 and projects beyond the end of the said arm. This finger 43 (see Figures 17, 18, 19) is adjustably secured to the arm 42 by bolts and operates to impart to a piece of glass 4 a desired curve or bend, and the support 41 (see Figure 15) for the arm 42 is adjustably connected with the lever 40, the adjustment being effected by a screw 1 and a knurled knob 2. By means of the rack and pinion combination, detailed in Figure 16, contained in the housing 23, and heretofore referred to, the column is actuated rotatably to swing the lever 40 and its finger 43 on an arc in accordance with the degree of bend desired in a tube that is positioned at one end against the end of the arm 42 and the inside of the finger 43. In the position of the parts indicated in Figure 10, the bending arm 42 has completed a 90° bend and the mold section carrying arm 31 is in position of cooperation with its companion mold, presently described, to enclose the bent tube and restore it to form by internal air or other fluid pressure. Bracket 26 (see Figure 7) which mounts the arm 31 that carries the mold section 32, is held in fixed position against the one end of a slot 59 in an arcuate member 60, by a spring 61, Figure 10. This arcuate member 60 is connected with the arm 42 by a set screw 62, and is movable relative to a stud 63 that is provided at the top of the bracket 26 upon which the arcuate member 60 rests. When it is desired to form a bend of greater arc than 90°, the forming arm 42 is rotated to a position substantially as occupied by the arm 31, which latter then, as the arcuate member 60 is moved with the forming arm, travels with the arcuate member 60 under the tension of the spring 61 to a position where the tension effort thereof is expended, but the arcuate member 60 may continue its travel relative to the stud 63 to the radial position desired.

The center line of the bar 42 intersects the axis of the column 18 and the inner edge of the finger 43 parallels said line and axis. The purpose of this provision is to render this inner edge adjustable with respect to the axis of the column about which the bar swings, this axis being a fixed one, and thereby to alter or vary the relationship of the longitudinal axis of a tube to be bent to the axis of rotation of the bar.

In Figure 1, the tube line K—J which is the center line of a length of tube, is maintained as such during the bending except for minor variations which are illustrated at E, F, and G, owing to the fact that the curve generated about the center X is a true arc, while the actual path traversed by the center line of the tube, if curved about such line, would be represented by J, E, F, G, and H. In Figure 2, the variance of the point about which the curve in a tube is generated is shown in slightly different application for controlling the outside line bend and in Figure 3, a bend by hand is shown, illustrating a marked disparity between the exterior wall and the inside wall. In controlled bending, to govern the thickness of the inside and outside wall, the center X of the arc to be formed, is shifted with respect to the axial line of the tube and the axis of movement of the forming or bending finger. Referring now to the finger 43, by which the bending of the tube is accomplished, and particularly to Figures 17 and 18, it will be seen that the axis of the tube 4, as placed against the end of the arm 42 and laterally against the inside of the finger 43, is not coincident with the axis of rotation of the arm 42. The differential between the axis of rotation of the bending arm and the point of generation of the bend in the tube controls the elongation and compression, respectively, of the outside and inside wall, and hence the relative thickness thereof, as well as the lineal extent of the tube.

The bar 22, on which the rack 22' is formed or provided, is substantially a piston that is housed in and operable by fluid pressure in a cylinder 44 (see Figure 11), the control of the fluid through line 45 thereto being by a valve device 45' operated to open and closed position by impulses through lines 46 and 46', governed by a general control valve arrangement, detailed hereinafter. It will be seen, therefore, that the lever 40 is rotatably operated with the column 18 by the rack 22' of the bar 22 under the influence of fluid pressure in the cylinder 44, and that the bracket 26 (see Figure 7) upon which the arm 31 is radially movable to carry the semi-circular mold 32 thereof to operative position, is normally a stationary unit when making bends of not greater than 90° angles. As will appear later, the operation of the semi-circular mold 32 is sequential to the bending operation of the finger 43, for the reason that it coacts with the mold about which the bend has been made for the purpose of confining the bend, deformed by bending and heat, when pressure is introduced into the tube, to restore its cylindricity to original form. As seen in Figures 7, 11 and 15, a clamp 47 is provided on the member 15 to hold fast the tube 4 to be bent upon the surface of the table 14, and a similar clamp is used to hold the tube against dislocation with respect to the bending finger 43 during the heating and bending operation. A form of clamp for this purpose is shown in Figures 12 and 13, from which it will be seen that the body 48 of the clamp is secured by a bolt or otherwise to the finger 43 and is provided with an upstanding channel portion 49 and with rearwardly extended ears 50 supporting a horizontal pin 51, for anchoring one end of a spring 52, the other end of the spring being connected to a pin 53 in a latch member 54. This latch member 54 has two extensions 55 and 56 in right angular relationship, the latter for engaging and clamping the glass tube 4 to the finger 43 and the former, which is a handle or lever when in operative position, that is, clamping position, being moved to a position, indicated in Figure 11, from which it will be seen that it is operable to release the tube simultaneously with the removal of the inside mold from the table and tube, as presently explained. Adverting to Figure 11, a downwardly directed burner 57 is adjustably supported above the table 14 to heat the mold section 32 when the arm 31 is in withdrawn position. An upwardly directed burner 58 is also adjustably associated with the table to heat the companion mold, later herein referred to.

Referring to Figures 7, 10 and 11, heating means for the bend area of a tube and mold form means are illustrated, these means following each other in the sequence named, and being reciprocated in a vertical direction as and for the purposes now described. In the frame 16, and on a plane higher than the table 14, is a suitably supported transverse member 68, upon which is mounted a carriage 69 that is reciprocably movable thereon by a piston 70 connected to the rear end of the carriage and operably disposed in a fluid pressure cylinder 71 to which fluid pressure from a suitable source 72 is admitted from a chamber 73 controlled by valves (not shown) that respond to impulses which are automatically set up in lines 74 and 75, as fully explained later. At its forward end, the carriage 69 mounts a cylinder 76 that is provided with a piston 77 to the end of which is connected a carrier means 78 (Figure 9) for a pair of opposed and cooperating mold sections 79 and 80, adapted to encase the tube 4 prior to the bending and after the heating thereof. The mold sections are connected to a guide post 81 that extends through the carriage 69. Operation of the piston in the cylinder 76 is by fluid pressure controlled by valves (not shown) in a chamber 82 to which fluid under pressure is admitted through line 83, the valves being operated by impulses directed through lines 84 and 85 and the impulses occurring in answer to a control mechanism, presently alluded to. One of the mold sections, to-wit, 79, is provided with a pin 86 which projects therefrom. The lever or handle 55 of the clamp 47, when in horizontal or clamping position, as shown in Figure 11, extends over the said pin 86 when the forming finger 43 upon which the clamp is carried, is moved to the position shown in said figure and in Figure 10. When, therefore, the mold sections 79 and 80 are lifted from the bent tube, the pin 86, engaging the lever 55, opens the clamp to release the tube. Referring to Figure 9, it will be seen that the mold sections 79 and 80 are pivotally connected to the bottom of the carrier means 78 to have a limited downward movement to encompass and remove readily from the glass tube when respectively lowered and elevated. For this purpose, the rear of the mold sections 79 and 80 are provided with upper surfaces that decline from the horizontal plane thereof, such surfaces, when the mold sections drop upon disengagement with the table 14 and tube 4, contacting and being held parallel to the underside of the carrier means 78 and maintaining the mold sections in open position. Also mounted on said carriage 69, immediately at the rear of and in alignment with the cylinder 76, is a cylinder 87 that is provided with a piston 88 to which is connected a cross member 89, Figure 15, having lateral guide bars or rods 90 that extend through suitable guides 91 at the sides of the carriage 69. To the cross member are adjustably connected burners 92 and 93 which are oppositely disposed and angled relatively to each other, to project the heat therefrom to the sides of and below the lateral center of the tube 4. Fuel is supplied to the burners 92 and 93 through flexible pipes 94 and 95 from a manifold 96. Operation of the piston 88 in the cylinder 87 to lower and lift the burners 92 and 93 is by fluid pressure conducted through a line 97 to a valve chamber 98, in which valves (not shown) are fluid impulse-actuated through lines 99 and 100, controlled as hereinafter described.

In the operation, the carriage 69 moves forward to position the burners 92 and 93 immediately above the tube 4, that has been placed and locked or clamped in position upon the table 14 and specifically upon that part of the tube that is to be bent, and hence is disposed in the area 13, Figure 17, represented by the asbestos insert. The burners 92 and 93 are then moved down toward the plate 13 to straddle the tube 4. A predetermined period of time elapses before the glass is rendered sufficiently plastic for bending. The burners are then lifted back to normally inoperative position, whereupon the carriage is retracted to place the molds 79 and 80 immediately over the heated area of the tube, the molds in the former forward position having been heated by the upwardly directed burner 58, Figure 11. Thereupon, the mold sections descend upon the plate 13, straddling the heated tube and encasing the major cylindrical area of the heated tube at the inside of the bend line. The bend of the tube thereupon follows. The rotating finger 43, which is a chordal member, controls the position of the center line of the tube 4 with respect to the radius of the arm 42. If the finger 43 is maintained parallel with and laterally shifted relative to arm 42, constant tube lengths may be caried, as shown in Figures 1, 2 and 3. This provision, of course, would move the center line of the tube to one side or the other of the radius of the arm, which rotates about an unchanging pivot, while the chordal member swings the tube about a center eccentric to said pivot, as shown. The cooperating mold arm 31 is then advanced to the position shown in Figures 18 and 19, to complete the encasement of the bent, but deformed tube. The mold section 32, the end of the bending chord member 43, and the section 80 of the dual mold assembly, are provided with mutually interengaging notches 101 for preventing injury to the tube bend and maintaining the mold at the distance correctly to represent the exterior circumference of the original tube, the restoration to which is accomplished by internal pressure of a fluid. In certain practices of the invention, the notches 101 are not used, the outside edges of mold 32 engaging cold portions of the tube 4. When the tube 4 is positioned upon the table 14, the end of the tube 4 adjacent an end of the radial arm 42 is stoppered by a cork, or other suitable plug 102, Figure 8, and the opposite end is enclosed by a body 103 of rubber or other material that is mounted upon a tubular member 104 provided at one end with a nut 105 for compressing the body 103 against an abutment head 106 surrounding said tubular member 104 and expanding it to seal the tube end. By means of a thrust collar 107 loose on said tubular body member 104, and a levered eccentric 108 pivotally connected to the end of the tubular member 104 and operable against said collar 107, the tubular body 103 is moved relative to the collar to produce an expansion of the rubber body to seal the tube. Fluid pressure is supplied to the tube 4 through a pipe 109 that is always in communication with the tubular body 104 which is connected to a line 110 that taps fluid under pressure from a cylinder 111 having a valve (not shown) controlled by impulses set up in lines 112 and 113 by a timing device, later referred to. In order to prevent rupture of the tube 4 owing to expansion pressure of the air trapped within the same when the seals are applied to the ends thereof, and the tube heated, a bleeder orifice 114 is provided in the pipe 109. The supply of pressure to the tube 4 to re-form same occurs after the bend has been made and while the mold elements are in position, as shown in Figures 18 and 19.

Thereupon, the mold-carrying arm 31 is withdrawn from the bend of the tube and the bend-forming head with the mold sections 79 and 80 lifted from the glass tube to position, preparatory to renewing its part in the cycle of operations. The bending chordal arm 42 now returns to normal starting position, which is that substantially shown in Figure 17, for a 90° bend. Obviously, any lesser bends are capable of being made, the bends shown being illustrative, and likewise any bend of greater degree than 90 may be effected by adjustment of the arcuately slotted member 60, as hereinbefore explained.

Referring now to Figures 20 and 21, the herein described bending of a glass tube to control the bend line thereof, is shown modified by the provision of a band 116 which is set for length while the tube is straight to maintain the length of tube on a definite line, such as a center line. This ribbon or band 116 is anchored at one end to a pin 117 upstanding from the table 14, and at the other end is anchored to a screw 118, upstanding from and connected to the radial arm 42, and is disposed immediately above the tube to be bent and substantially parallel with the lineal extent of the tube. In this instance, the radius arm 42 is under radial tension of a spring 119 to maintain taut the band or ribbon 116 as it winds around a pivot pin 120 on the mold 79, positioned for whatever line tube bend may be desired. The forms illustrated in Figures 20 and 21 are, of course, adaptable for use with the instrumentalities heretofore detailed.

In Figures 23 to 26, I have shown how this band control arrangement may be adapted for use in a standard mold form operated manually. In this instance, the ends 121 and 122 of the sectional mold 123 are connected by the metal ribbon or band 124 which extends above the glass tube 4 and in contact with bending posts 125 on a mold 126 complementary to the sectional mold 123. When the sectional mold 123 is wrapped around the posts 125, the operator holding the handles 127 and 128, the tube 4 is wrapped around the complementary mold 126.

Hereinbefore, I have referred to conduits or pipe lines for conveying a fluid under pressure from a source to the various valve chambers 37, 45', 73, 82 and 98, for controlling, in the sequence established, the flow of fluid pressure to the various motors 34, 44, 71, 76 and 87, to operate them reciprocably. Since, in the present disclosure, the actuating force is pneumatic, the source of such fluid is shown as produced by a compressor 150, from which the distribution is effected from a conduit 151 to conduit 152 by means of a valve treadle 53, the opening of which initiates and maintains the machine in operation through its various cycles. A conduit 200 is a main line for supplying fluid from the compressor 150 to a plurality of regulators 154, 155, 156, 157, 158 and 159, from which it is sequentially released under a predetermined pressure to all of the valve chambers 37, 45', 73, 82 and 98 and through conduit 160 to the valve chamber 111, which controls the delivery of the fluid pressure required to restore the work, to-wit, the tube, to its original cylindrical condition. It will be noted that the main pressure lines 37', 45, 72, 83, 97 and 160 are always charged with fluid, and stem from the respective regulators 154–159, inclusive, and that the valves (not shown) in the chambers 37, 45', 73, 82, 98 and 111, are impulse-actuated to admit fluid pressure to the motors 34, 44, 71, 76, 87 periodically alternately to effect reciprocation of the motors. Likewise, impulse actuated valves (not shown) in the chamber 111 control the supply of fluid pressure from the regulator-connected line 160 to the delivery line leading from the chamber 111 to the glass tube; and hence it will be clear that the function of the valve chambers and their complements, is merely to govern the fluid supply to the motors, specified above. The impulse control is automatically implemented by a form of instrumentation illustrated clearly in Figures 7, 10, 15 and 27, from which it will be seen that two relatively spaced rows 161 and 162 of housings for valves are provided, the stems 163 and 164 (Figure 11) of the valves (not otherwise shown, since they are old in the art and form no part of the present invention) projecting beyond the housings and being disposed opposite each other in the stated spaced relationship, their position as shown, Figure 11, being vertical, though any other position would answer the purpose. The lower row 162 comprises three housings 165, 166 and 178, the housings 165 and 166 being relatively close to each other and the housing 168 being spaced a considerable distance from the housing 166, this distance representing a predetermined interval of time, to-wit, that period required to heat the glass tube to a plastic condition through the medium of the burners 93. The upper row 161 comprises a plurality of aligned housings 167 to 176, inclusive, with their valve stems projecting downwardly. Between the rows 162 and 163 of said valve housings is a bar 179 (Figures 11 and 15) that is supported and operates on suitable guideways and is connected with a plunger 180, by which it is reciprocated. The plunger 180 is a piston that is contained in a cylinder 181 having a fluid pressure pipe connection 182 (Figure 27), and an impulse-actuated valve (not shown) in a chamber 183 connected with impulse-creating lines 184 and 185 for governing the admission of fluid pressure through pipe 182 (Figure 27). The bar 179, Figure 11, is provided with an upper pawl 186, and a lower pawl 187, respectively cooperating with the upper and lower valve stems 163 and 164. The upper pawl 186, Figure 14, pivots in said bar 179 and is held pressed against a vertical wall 189 therein by a spring 190, and one side of the upper end of said pawl 186 is beveled as at 191, while the rear of the pawl is flat. When the bar 179 is moved in one direction to control the fluid pressure for the consecutive operation of various parts of the machine, the beveled edge 191 of the pawl 186 engages seriatim the projecting valve stems 163 and, being maintained in upright position by the vertical wall 189, depresses or moves the valve stems in regular succession. The lower pawl 187 pivots in the bottom of said bar 179 and is held against a vertical wall 192 by a spring 193. The lower front end of said pawl 187 is beveled at 194 and operates in relation to the valve stems 164 in precisely the same, but reversed, manner, as the pawl 186.

It will be seen that when the valve 153, which may be a foot valve, is operated, the movement of the machine is initiated in that the plunger 180 is drawn into its cylinder 181 and carries with it the bar 179, the pawls 186 and 187 of which 187 consecutively engages and operates the valve stems 164 of the housings 165 and 166. When the pawl 187 has traversed the distance between the housing 166 and engages the valve stem 164 of the housing 178, the flow of pressure fluid is admitted to the opposite end of the cylinder 181, Figure 10, thereby causing the bar 179 to travel in the opposite direction and consecutively move the pawl 186 into operative contact with the valve stems 163 of the housings 167 to 176, inclusive.

Assuming that the burners 92 have been moved to proximity to the table top for heating the glass or other tube, the impulse for actuating the fluid control valve to lower the burners is created by depressing the valve in the housing 166 through line 99. The heat application continues until the pawl 187 traverses the distance from said housing 166 to the housing 178, the depression of the valve stem 164 of which causes the fluid to produce a reversal of the travel of bar 179 and hence an engagement of the pawl 186 with the valve stem 163 in the housing 167. This valve produces in the cylinder or chamber 98 an impulse that opens the valve to admit fluid to the opposite end of the motor 87 and thereby lift the burners from the tube; and this action is followed by the retraction of the burners and carriage, as the valve in housing 168 is operated by the pawl 186. The mold-motor 76 is then operated to lower the molds upon the heated glass. The stem 163 of housing 169 is actuated by the pawl 186, the impulse to the valve chamber 82 being created at one side of the motor 76 through line 84 and at the other side thereof through line 85, controlled by the valve stem 163 in the housing 175.

Impulses to the valve chamber 45' to control the movement rotarily of the bending area are set up when the valve stem 163 in housing 170 is depressed, the fluid flow traversing lines 46' and 46, the latter terminating in housing 176. Impulses to the valve chamber 37 to control the motor 34 for operating the radial mold are set up when the valve stem 163 in housing 171 is depressed, the flow of fluid traversing lines 39 and 38, the latter terminating in housing 174.

Impulses to the valve chamber 111 to supply air to the tube to restore the cross-sectional area are created when the valve stem 163 in housing 172 is operated, the flow of fluid occurring through line 113 and 112, the latter terminating in housing 173. It will be understood that where a line is stated as terminating, the fluid pressure is delivered to the opposite side of the motor to return the instrument effected to normal position, and obviously this is attended by an exhaust of the fluid previously used to move the element in the opposite direction.

I claim:

1. In an apparatus of the character disclosed, the combination of a table for supporting a length of tubing, a pivot member disposed axially of said table and mounting a radial arm against the end of which said tube is adapted to abut, a chordal bending arm associated with said radial arm to move over the face of and in contact with said table, means to heat the tubing to plastic condition, mold means vertically and radially reciprocable to enclose a portion of said tubing, and means to operate said radial arm to cause the chordal member to bend the tubing around one of said mold means while in contact with the face of said table.

2. In an apparatus of the character disclosed, a plane support for a length of tubing, means to heat the tubing in a portion thereof and laterally below the center thereof to a condition of varying plasticity, a chordal arm lying flat upon the face of said support and engaging a portion of the tubing beyond the heated area thereof and movable to bend the tubing, said arm having an axial pivot, and means to rotate said arm about said pivot upon the face of said support.

3. In a tube bending machine, a table for supporting a length of tube to be bent, a pivot below said table, an arm connected to said pivot and provided with a chordal bending means disposed upon and operable over the face of and in contact with said table, means for differentially heating the sides of the tube, mold means on the table, and means to rotate said pivot to swing said chordal bending means over the surface of said table, and bend the tube placed there-against over said mold means, and a mold to cooperate with said mold means after the bend is made to enclose the bend of the tube while still pliably hot.

4. In a tube bending machine, a support for a length of tube, a pivot below said support, a chordal bending means, an arm secured to said pivot and adjustably carrying said bending means, means reciprocable relative to said support to heat the tube laterally and then to remove from the tube, a mold means movable against the heated tube, means to rotate said pivot to move said chordal bending means and tube about said mold means, a mold to cooperate with said mold means after the bend is made, and means to move said last named mold radially.

5. In a glass tube bending machine, an annular table for supporting a length of tube, an axial pivot underneath said table, a radial arm secured to said pivot provided with a chordal member extending beyond the end of said arm and lying upon the face of said table, said radial arm having its end in abutting relationship to said tube, means to heat the tube, pneumatically controlled means to rotate said pivot to move said chordal member over said table and bend said tube, means movable on the surface of said table, and on opposite sides of the bend of said tube to enclose the heated area of the tube, and means to supply internal pressure to said tube to correct any deformity thereof.

6. In a tube bending machine, a support for a piece of tube, a radial arm pivoted to swing on top of said support and provided with an adjustable chordal bending member which extends beyond the end of said arm and against which and to the end of said arm the piece of tube is adapted to be placed, a downwardly directed heating means to reduce the tube at the sides thereof to a plastic condition, a mold means movable relative to the surface of the support to provide a bend arc for the tube, means to rotate said radial arm and its chordal member to bend the piece of tube, means complementary to said mold means to enclose the bend of the tube, and means to supply internal pressure to the tube to restore the same to original cross section.

7. In a tube bending machine, a support for a piece of tube, a radial arm pivoted to swing axially relative to and in contact with the top of said support and provided with a chordal extension for bending a piece of tube placed there-against and against the end of said arm, means to reduce the sides of the tube to a more plastic condition than the top or bottom, means to rotate said arm and its chordal extension to bend the tube so heated and means to enclose the bend of the tube while still heated.

8. In a tube bending machine, an annular, plane support for a piece of tube, a chordal member swingable relative to and in contact with the support surface and having an axial pivot, said tube lying in parallel juxtaposition to said chordal member, means so disposed as to heat the opposing sides of the tube below the side center to a plastic condition, while maintaining relatively cool the top and bottom of the tube, means to rotate said axial pivot to swing said chordal member and the tube lying thereagainst about a center at variance with said axial pivot mold means operable over the face of the support to enclose the heated bent area of the tube, and means to supply internal pressure to said tube while enclosed by said mold means to restore it to original cross section.

9. In a machine for bending glass tubes, the combination of: an annular table for supporting a length of tube, a chordal member having an axial pivot associated and in engagement with said table, said tube being adapted to lie in parallel juxtaposition to said member, differential heating means for the sides of the tube, means to rotate said axial pivot to move said chordal member and bend the tube lying thereagainst about a center eccentric to said axial pivot, mold means operable on and over the face of said table to enclose the bent area of said tube while still heated, and pressure means to restore the tube to original form while enclosed in said mold means.

10. In a machine of the character mentioned, the combination of a support for a straight piece of tube, a chordal member having an axial pivot associated with said table, and extending to near but eccentric of the axial pivot thereof, a means movable to a position to heat said tube to plastic condition, a plurality of mold means, one of said mold means being movable adjacent to the heated area of said tube, means to rotate said axial pivot and move said chordal member to bend the heated tube about said mold means and a center eccentric to said pivot means, means to move the other of said molds against the bend in the tube, and into cooperative relation with said first named mold to enclose the bent tube, and means to restore the cross section of the tube while so enclosed.

11. In a machine for bending glass tubes, the combination of a table for supporting a length of tube, a radial arm pivoted to swing axially relative to and on top of said table, and provided with a chordal extension for bending a piece of tube placed thereagainst and against the end of said arm, means to heat the sides of said tube, a mold over which said tube is bent, said mold provided with a pin, a stud on said table and a stud on said radial arm, a band of metal connected to said last named studs and disposed above said tube, means to hold said band of metal tensioned, and means to move said radial arms to bend said band about the pin on said mold concurrently with the bending of said tube.

12. In a machine for bending glass tubes, the combination of a table for supporting a length of tube, a radial arm pivoted to swing axially relative to and on the top of said table and provided with a chordal extension for bending a piece of tube placed thereagainst and against the end of said arm, means to heat the sides of said tube, a tensioned band anchored at one end to said table and at the other end to said radial arm and disposed above said tube, a guide mold for said tube having a fixed point, and means to move said radial arms to bend said band about the fixed point concurrently with the bending of said tube.

13. In a tube bending machine, a table for a length of tube, a chordal bending means, an arm mounted to pivot below said table and adjustably carrying said bending means, means to heat the table laterally, a mold means movable against the heated tube, means to move said chordal bending means and tube about said mold means, a mold to cooperate with said mold means after the bend is made, means to move said last named mold radially into and out of engagement with said tube.

RALPH BROWN.

REFERENCES CITED

The following references are of record in the file of this patent:

UNITED STATES PATENTS

| Number | Name | Date |
|---|---|---|
| 2,064,039 | Shively et al. | Dec. 15, 1936 |
| 2,265,070 | Goode | Dec. 2, 1941 |
| 2,476,658 | Greiner | July 19, 1949 |